United States Patent
Dailey et al.

(10) Patent No.: US 6,619,109 B1
(45) Date of Patent: Sep. 16, 2003

(54) STEAM TURBINE INLET BELL SEAL INSPECTION APPARATUS AND METHOD

(75) Inventors: George F. Dailey, Pittsburgh, PA (US); Mark Fischer, Pittsburgh, PA (US); Michael J. Metala, Murrysville, PA (US); James A. Bauer, Gibsonia, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 207 days.

(21) Appl. No.: 09/669,785

(22) Filed: Sep. 25, 2000

(51) Int. Cl.[7] .................. G01M 15/00; G01M 3/04; G01L 3/26
(52) U.S. Cl. .................. 73/119 R; 73/116; 73/49.7
(58) Field of Search ................. 73/40.5, 866.5, 73/865.9, 116, 117.4, 119 R, 49.7; 415/134, 136, 138; 277/236, 116.8

(56) References Cited

U.S. PATENT DOCUMENTS

| | | |
|---|---|---|
| 3,750,711 A | 8/1973 | Conklin et al. |
| 3,907,308 A | 9/1975 | Stock |
| 3,922,907 A | 12/1975 | Hurwitz et al. |
| 4,067,349 A | 1/1978 | Austin et al. |
| 4,388,831 A | 6/1983 | Sherman |
| 4,741,203 A | 5/1988 | Willaman et al. |
| 4,802,679 A | 2/1989 | Chen et al. |
| 4,806,863 A | 2/1989 | White |
| 4,808,924 A | 2/1989 | Cecco et al. |
| 4,811,091 A | 3/1989 | Morrison et al. |
| 4,812,105 A | 3/1989 | Heymann |
| 4,856,337 A | 8/1989 | Metala et al. |
| 4,955,235 A | 9/1990 | Metala et al. |
| 5,025,215 A | 6/1991 | Pirl |
| 5,105,876 A | 4/1992 | Burack et al. |
| 5,140,264 A | 8/1992 | Metala et al. |
| 5,142,230 A | 8/1992 | Nottingham |
| 5,146,786 A | 9/1992 | Nachbar |
| 5,164,826 A | 11/1992 | Dailey |
| 5,333,502 A | 8/1994 | Clark, Jr. et al. |
| 5,438,862 A | 8/1995 | Keating et al. |
| 5,442,285 A | 8/1995 | Zombo et al. |
| 5,443,589 A * | 8/1995 | Brandon ............... 415/134 |
| 5,484,260 A | 1/1996 | Brandon |
| 5,563,357 A | 10/1996 | Longree |
| 5,635,780 A | 6/1997 | Kohlert et al. |
| 5,670,879 A | 9/1997 | Zombo et al. |
| 5,997,249 A | 12/1999 | Bell |

FOREIGN PATENT DOCUMENTS

DE 29714238 U1 7/1998

* cited by examiner

*Primary Examiner*—Edward Lefkowitz
*Assistant Examiner*—Maurice Stevens (57) ABSTRACT

An inspection apparatus (40) for in-situ leak testing of the bell seal (30) of a steam turbine (10). The apparatus includes a pair of inflatable bladders (48,52) for defining a sealed volume having the bell seal (30) as its only leakage path. The mass flow rate of pressurized air (70) at various pressures through the bell seal (30) is compared to the known flow rates through a similarly designed bell seal having various degrees of degradation. A camera (60) rotated by motor (62) between the bladders (48,52) provides an indication of the proper positioning of the inspection apparatus (40) and facilitates a visual inspection of the bell seal (30) and retaining nut (42). The inspection apparatus (40) may be inserted into an inlet to the turbine through a disassembled flow control valve without the need for any disassembly of the turbine.

26 Claims, 5 Drawing Sheets

STEAM TURBINE INLET BELL SEAL INSPECTION APPARATUS AND METHOD

BACKGROUND OF THE INVENTION

This invention relates generally to the field of non-destructive examination, and more specifically to the non-destructive examination of portions of a steam turbine apparatus, and particularly to an apparatus and method for the remote inspection of the bell seal area of a high pressure steam turbine.

Steam turbines are well known in the power generation industry. A steam turbine is a device operable to extract energy from a flow of high pressure, high temperature steam and to convert that energy into mechanical energy in the form of the rotation of a shaft. The steam flow may be generated by any known type of steam generator, such as for example, a fossil fueled boiler or a nuclear steam supply system. The rotating shaft of the turbine is commonly connected to a rotor shaft of an electrical generator to convert the mechanical energy of the rotating shaft into electrical energy for distribution via the power grid.

Figure 1:
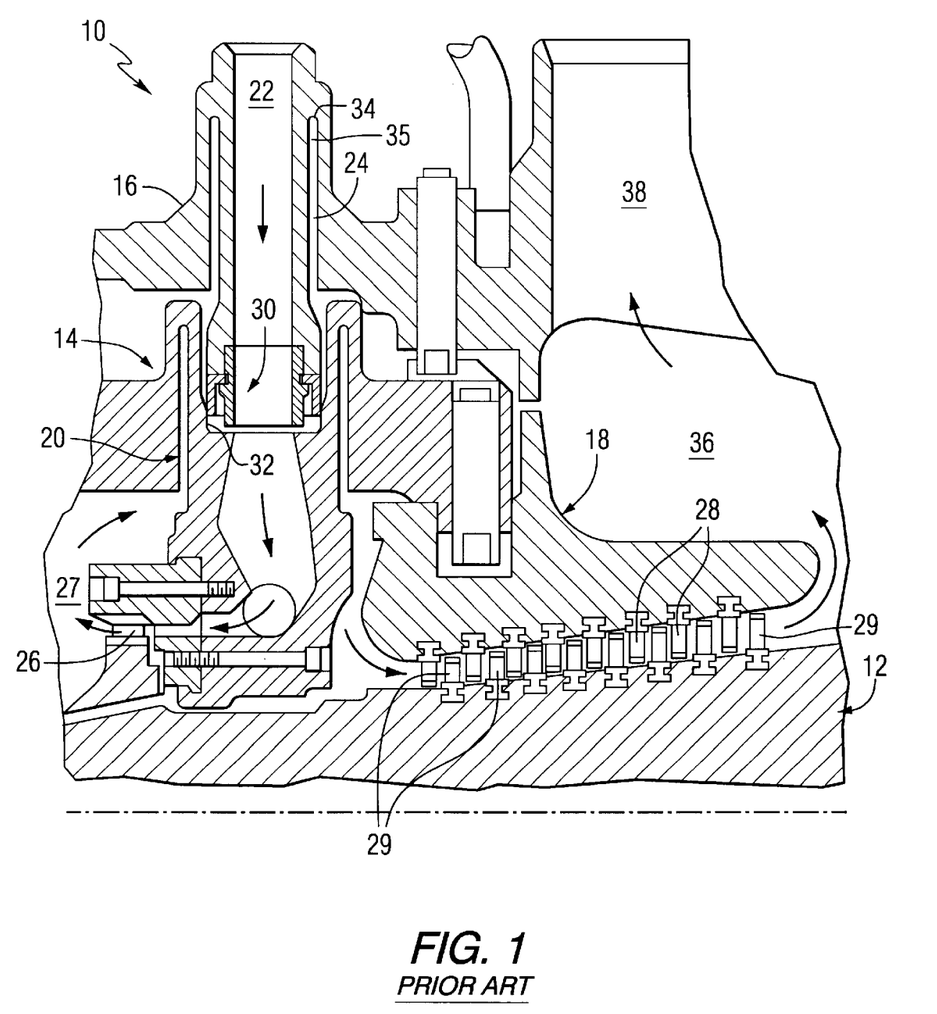
FIG. 1 is a partial cross-sectional view of a prior art steam turbine showing the major elements of the turbine including the inlet sleeve trepan area and the bell seal.

A typical steam turbine is illustrated in FIG. 1. The steam turbine 10 includes a rotor shaft 12 journaled for rotation within an inner cylinder 14 and an outer cylinder 16. The inner cylinder 14 includes, among other parts, a blade carrier ring 18 and several nozzle chamber units 20 each welded to the inner cylinder so as to become an integral part thereof. The outer cylinder 16 includes one or more high pressure steam inlets 22 and a number of inlet sleeve units 24, each of which extends inwardly in telescoping relation to its associated nozzle chamber 20 in the inner cylinder 14. Steam enters the turbine inlet 22 from a high pressure steam line (not shown) downstream from one or more control valves (not shown) into a nozzle chamber 20 integrally attached to the inner cylinder 14. The steam then passes through the nozzles and rotating blades 26 of the control stage, which are attached to the rotor shaft 12. Steam flows from several parallel inlet paths flows into a control stage chamber 27 and around the nozzle units 20 to merge together to flow through the remainder of the turbine array of stationary 28 and rotating 29 blade rows. The expanded steam exiting the blade rows enters a steam outlet annulus 36 formed between the inner and outer cylinders 14, 16 and is directed to an outlet 38.

The inlet steam flow must pass between the inner and outer cylinders 14, 16 without leakage there between. This requires a static seal that will withstand extremely high pressures, high temperatures, and differential thermal expansion. The seal must be substantially fluid tight and stable under conditions of extremely high velocity and sometimes pulsating steam flow. The seal assembly repeatedly encounters dynamic instability, vibration, and thermal shock during use. It is know to use a bell seal 30 for this application. Several known designs of such bell seals are described in U.S. Pat. No. 3,907,308 dated Sep. 23, 1975; U.S. Pat. No. 4,802,679 dated Feb. 7, 1989; and U.S. Pat. No. 4,812,105 dated Mar. 14, 1989.

Reliable operation of a steam turbine is desired in order to ensure the integrity of the electrical power supply and to avoid unplanned and therefore more costly repairs resulting from failures during the operation of the turbine. A variety of routine inspections are performed on a steam turbine to assess the condition of the machine during its useful operating life, and to detect degraded conditions before they mature into a component failure. The inlet sleeve area of a turbine is subject to extremes of temperature, thermal shock, vibration, and differential expansion, and as such, is an area vulnerable to mechanical wear and cracking. In particular, it is known that the surface 32 of the inner cylinder 14 in contact with the bell seal is subject to wear. Such wear can result in a decrease in the effectiveness of the bell seal and a greater leakage between the inner cylinder 14 and the outer cylinder 16 than is desired. Furthermore, the trepan radius area 34 of the outer cylinder inlet sleeve 24 has been known to develop high cycle fatigue cracks in some turbines.

It is known to inspect portions of a steam turbine by inserting a miniature camera into the turbine through the main steam inlet nozzle 22, such as is taught by U.S. Pat. No. 5,164,826 dated Nov. 17, 1992. However, inspections of the bell seal and trepan radius areas 30, 34 have previously been performed with the turbine out of service and with the turbine casing disassembled to provide access to these parts. Once the turbine is disassembled, the bell seal 30 may be visually inspected and measured for wear. The known techniques for the inspection of the bell seal of a steam turbine are time consuming and expensive because they involve the disassembly of the turbine. Consequently, these inspections are generally performed only during scheduled turbine maintenance outages when the turbine is being disassembled for other purposes

BRIEF SUMMARY OF THE INVENTION

Thus there is a particular need for an inspection technique that provides a non-destructive examination of the inlet sleeve bell seal without the need for the disassembly of the turbine. Accordingly, a method for inspecting the inlet sleeve bell seal of a steam turbine is described herein, the method including the steps of providing a tool having a pair of bladders spaced along a guide tube; inserting the tool into a turbine inlet to an inspection position wherein a turbine bell seal is disposed between the pair of bladders; inflating the pair of bladders to form a sealed volume having a leakage path through the bell seal; establishing and varying a flow of pressurized air into the sealed volume; and recording data representing the pressure in the sealed volume as a function of the rate of flow of pressurized air; comparing the recorded data to predetermined standard data to determine a condition of the bell seal. The method may also include the steps of providing a camera on the tool; monitoring the output of the camera during the step of inserting the tool into a turbine inlet to determine when the tool is in the inspection position; and monitoring the output of the camera to perform a visual inspection of the bell seal.

A method of testing the inlet sleeve bell seal of a steam turbine as described herein may alternatively include the steps of generating an algorithm for predicting the degree of degradation of a bell seal based upon the mass flow rate of air flowing through the bell seal under various pressure conditions; providing an inspection tool adapted for measuring the mass flow rate of air flowing through a bell seal installed in a turbine; inserting the inspection tool into an assembled steam turbine through an opening; obtaining measurements of the mass flow rate of air flowing through the bell seal of the turbine under various pressure conditions by operating the inspection tool; and predicting the degree of degradation of the bell seal of the turbine by apply the measurements to the algorithm.

An apparatus for in-situ inspection of a bell seal of a turbine is described herein as including a guide tube adapted for insertion into an inlet of a turbine; a pair of inflatable bladders attached to the guide tube and separated by a space sufficient to span a bell seal of the turbine; an inspection air flow path having an outlet disposed between the pair of bladders; a flow sensor for indicating the rate of flow of air through the inspection air flow path; and a pressure sensor for indicating the pressure in a space between the bladders. The apparatus may further include a camera connected to the guide tube and disposed between the pair of inflatable bladders, and a motor connected between the camera and the guide tube for rotating the camera about a longitudinal axis of the guide tube.

An inspection apparatus that may be used for performing the disclosed method may include a guide tube having an insertion end; a trailing bladder connected to the insertion end of the guide tube; a leading bladder spaced apart from and connected to the trailing bladder; a means for selectively inflating each of the trailing bladder and the leading bladder; a means for providing a variable flow of air to the space between the leading bladder and the trailing bladder; a means for measuring the rate of flow provided by the means for providing a variable flow of air; and a means for measuring the static air pressure in the space between the leading bladder and the trailing bladder.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
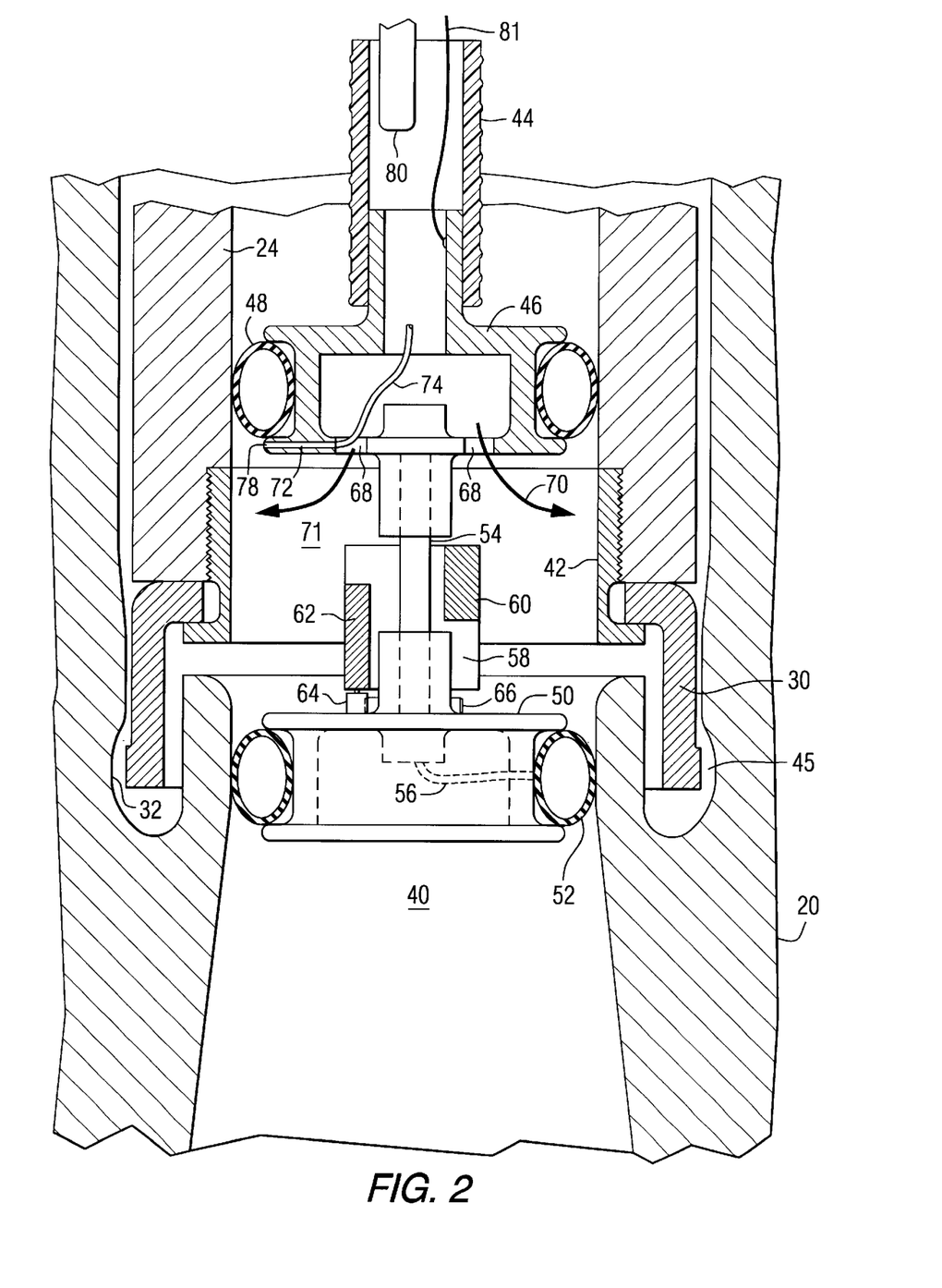
FIG. 2 is a cross-section view of an inspection tool in position to inspect the bell seal of the turbine of FIG. 1.

FIG. 2 illustrates an inspection apparatus 40 inserted into the fully assembled steam turbine 10 and located proximate a bell seal 30. As is known in the art, bell seal 30 minimizes the leakage of high pressure steam between the inlet sleeve 24 and the nozzle chamber 20. Bell seal 30 is held in position by a retaining nut locking ring 42 threadably engaged with the inlet sleeve 24. The bell seal 30 has a limited freedom of movement in a radial direction with respect to the axis of the inlet sleeve 24, and is free to slide longitudinally along wear surface 32 to accommodate differential thermal expansion between the inner and outer cylinders 14, 16. Such movements of bell seal 30 will cause wear and tend to enlarge the gap 45 between the bell seal 30 and the nozzle chamber 20. In one design, the maximum radial size of gap 45 should be no more than 0.010 inches in order to appropriately limit the leakage of steam there through.

Inspection apparatus 40 includes a guide tube 44 adapted for insertion into an inlet 22 of a steam turbine 10. Guide tube 44 may be, for example, a nylon reinforced flexible tubing. Guide tube 44 is attached to a trailing bladder assembly including a trailing spool piece 46 and an inflatable trailing bladder 48. A leading bladder assembly including leading spool piece 50 and leading inflatable bladder 52 is directly or indirectly connected to the guide tube 44, such as by shaft 54 connected between the respective spool pieces 46, 50. An inflation air flow path such as tube 56 is provided for each of the inflatable bladders 48, 52 for providing compressed air or other gas to cause the inflation of the bladders. Tube 56 may extend through the interior of guide tube 44 so that the inflatable bladders 48, 52 may be selectively inflated and deflated from outside the assembled turbine. Once the bladders 48, 52 are inflated, the space 71 between the bladders becomes a sealed volume having as its only leak path the bell seal 30.

A camera frame 58 is rotatably supported on the shaft 54 for support of a miniature camera 60. A motor 62 attached to camera frame 58 has an output 64 engaged with a gear 66 attached to leading spool piece 50. The operation of motor 62 will thereby cause the rotation of the motor frame 58 and camera 60 about the longitudinal axis of the shaft 54 and guide tube 44. Alternatively, the motor 62 may be connected in a variety of manners between the camera 60 and any one of the leading spool 50, trailing spool 46, and shaft 54. Electrical leads (not shown) for both the camera 60 and motor 62 may extend through the interior of guide tube 44 for connection to appropriate control systems exterior to the turbine. In one embodiment, such electrical leads may be connected through a slip ring to avoid the twisting of the leads as the camera frame 58 is rotated. Alternatively, motor 62 may be provided with an encoder and appropriate software controls to limit the rotation of the motor frame 58 to no more than 360 degrees. In a further embodiment, two rotational limit switches may be provided to limit the rotation of camera frame 58, such as to 350–355 degrees of rotation. When a limit switch de-energizes the motor 62, the operator can reverse the direction of rotation, thereby cycling between the rotational limits. Even if the extent of rotation is less than 360 degrees, the wide viewing angle provided by a pin-hole camera lens will enable the operator to have more than a 360 degree viewing range.

One or more openings 68 are provided in the trailing spool piece 46 to allow the flow of inspection air 70 into the space 71 between the leading inflatable bladder 52 and the trailing inflatable bladder 48. Inspection air 70 may be provided from exterior to the turbine through the interior of guide tube 44 or through a dedicated inspection air flow path such as a separate length of flexible tubing (not shown) disposed within the guide tube 44.

A passage 72 is formed in the trailing spool piece 46 and has an opening into the space 71 between the inflatable bladders 48, 52. Passage 72 is connected to a tube 74 that extends through guide tube 44 to the exterior of the turbine where it is connected to a pressure sensor 76. The location of the outlet 78 of opening 72 is preferably selected to be in a position which accurately experiences the static air pressure existing in the space 71 between the bladders 48, 52. Thus, opening 78 should be located away from high flow areas of inspection air 70.

Inspection apparatus 40 may be inserted into an assembled steam turbine 10 through a disassembled valve in the main steam line or other convenient opening. Apparatus 40 may be inserted by manually pushing guide tube 44 or by using a mechanical probe pusher as is known in the art. A flexible fiberglass rod 80 may be inserted into guide tube 44 to prevent the buckling of the guide tube 44 under compression loading. A safety cable 81 is provided to ensure that the inspection apparatus can be removed from the turbine under all circumstances. The output of camera 60 may be monitored as the tool 40 is inserted into the turbine in order to accurately position the inspection tool 40 proximate the bell seal 30. Camera 60 may be utilized to conduct a visual inspection of the bell seal 30 including locking ring 42. Certain conditions such as cracking or the loosening of locking ring 42 may be detected by such a visual inspection. Once in position a proper inspection position, inflatable bladders 48, 52 may be inflated on opposed sides of bell seal 30 in order to create a sealed volume 71 having only a single leakage path through the bell seal 30. A flow of pressurized inspection air 70 may then be introduced into the sealed volume 71, thereby creating an elevated pressure within volume 71 and a leakage flow rate around bell seal 30. Measurements of the mass flow rate of air through the bell seal 30 under various pressure conditions may be recorded. Data may be recorded while varying the flow of inspection air 70 and recording the pressure in the sealed volume 71 as a function of the rate of flow of pressurized inspection air 70. Because it is important that the only leakage path from the sealed volume 71 is through the bell seal 30, the proper operation of inflatable bladders 48, 52 may be tested prior to performing the leakage test on the bell seal 30. This may be accomplished by inserting the inspection tool 40 to a test position removed from the bell seal 30 in an area of the inlet sleeve 24 having only a smooth type inside diameter. The inflatable bladders 48, 52 may then be inflated to form a sealed volume having no known leakage path. By introducing pressurized area into this sealed volume having no known leakage path, and by monitoring the pressure in the sealed volume, it is possible to confirm the proper operation of the bladders 48, 52. Such testing of the bladders may be performed prior to leak testing the bell seal 30, and may be repeated again after the bell seal linkage test sequence in order to verify the ongoing proper operation of the bladder seals. In this manner, it may be confirmed that the entire recorded flow of inspection air 70 is flowing past bell seal 30.

Figure 3:
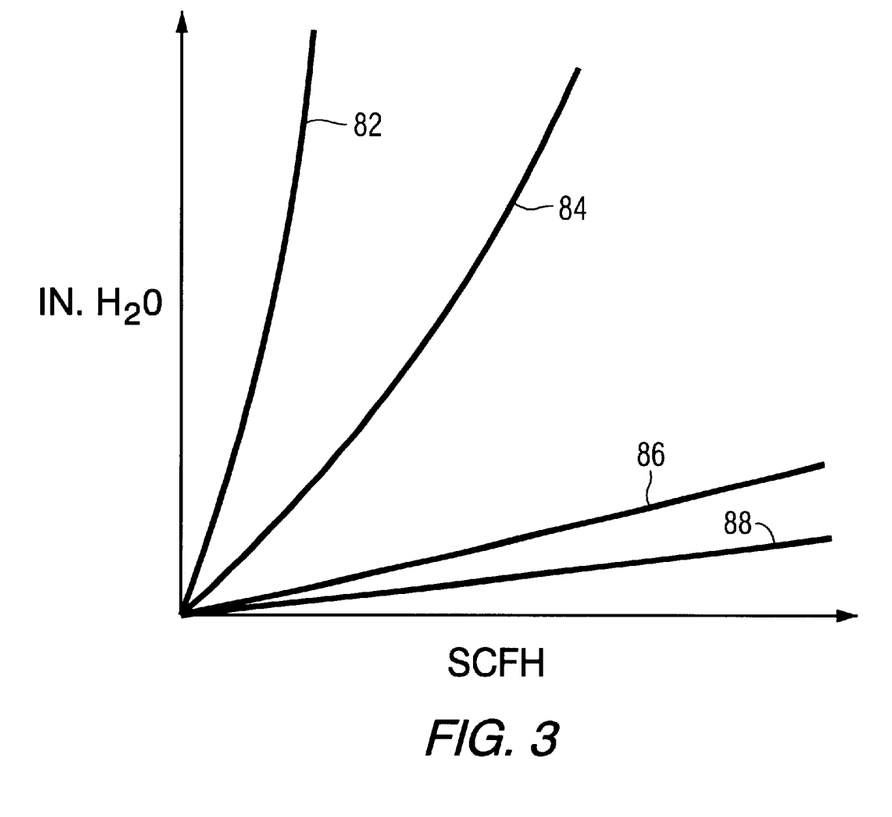
FIG. 3 is a plot of pressure verses flow for a particular bell seal design having various amounts of wear.

FIG. 3 illustrates a plot of the flow rate of air past a bell seal as a function of the driving pressure on the inside diameter of the bell seal for several different degrees of degradation of the bell seal. The horizontal axis represents the flow of air past the bell seal, and the vertical axis indicates the pressure driving such flow. Curve 82 illustrates the performance of a relatively new bell seal and nozzle chamber unit combination, where the gap 45 is at a minimum, such as for example a 2 mil diametral clearance. As evidenced by the slope of the curve 82, a high amount of pressure is needed to induce a relatively low amount of leakage past the bell seal. Curve 84 represents the same bell seal having approximately 8 mils diametral clearance. As can be seen from curve 84, the amount of flow past the bell seal is significantly increased for any given pressure. Similarly, curve 86 represents the conditions for a bell seal having 14 mils diametral clearance, and curve 88 represents a bell seal having a design maximum diametral clearance of 20 mils. A curve such as illustrated in FIG. 3 represents an algorithm that may be used for predicting the degree of degradation of a bell seal based upon the mass flow rate of air through the bell seal under various pressure conditions. A particular algorithm such a FIG. 3 may be developed for each design of bell seal, including various ranges of degradation. Such an algorithm may be established under laboratory conditions and may be utilized to evaluate field measurements of the mass flow rate of air through a similarly designed bell seal collected using the inspection tool 40 of FIG. 2 for an in-situ bell seal.

Figure 4:
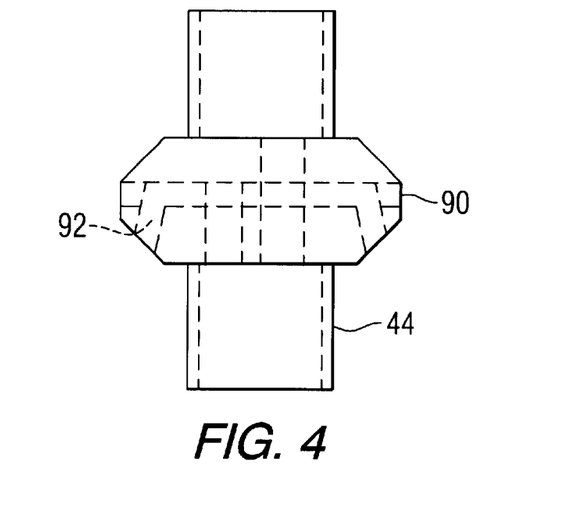
FIG. 4 is an elevation view of a jet assist nozzle that may be used with the inspection tool of FIG. 2.

FIG. 4 illustrates a device that may be utilized to assist in the insertion of the inspection tool 40 into a turbine. Guide tube 44 is illustrated as being connected to a jet assist nozzle 90. Jet assist nozzle 90 is formed to have a series of internal passages 92 operable to direct a flow of pressurized air in a direction opposite the desired insertion direction. The jet affect of such a flow of pressurized air will be a driving force exerted on the guide tube 44 in the direction of insertion. Such jet assist air may be provided through the interior of guide tube 44 or through a separate jet assist air flow path.

Figure 5:
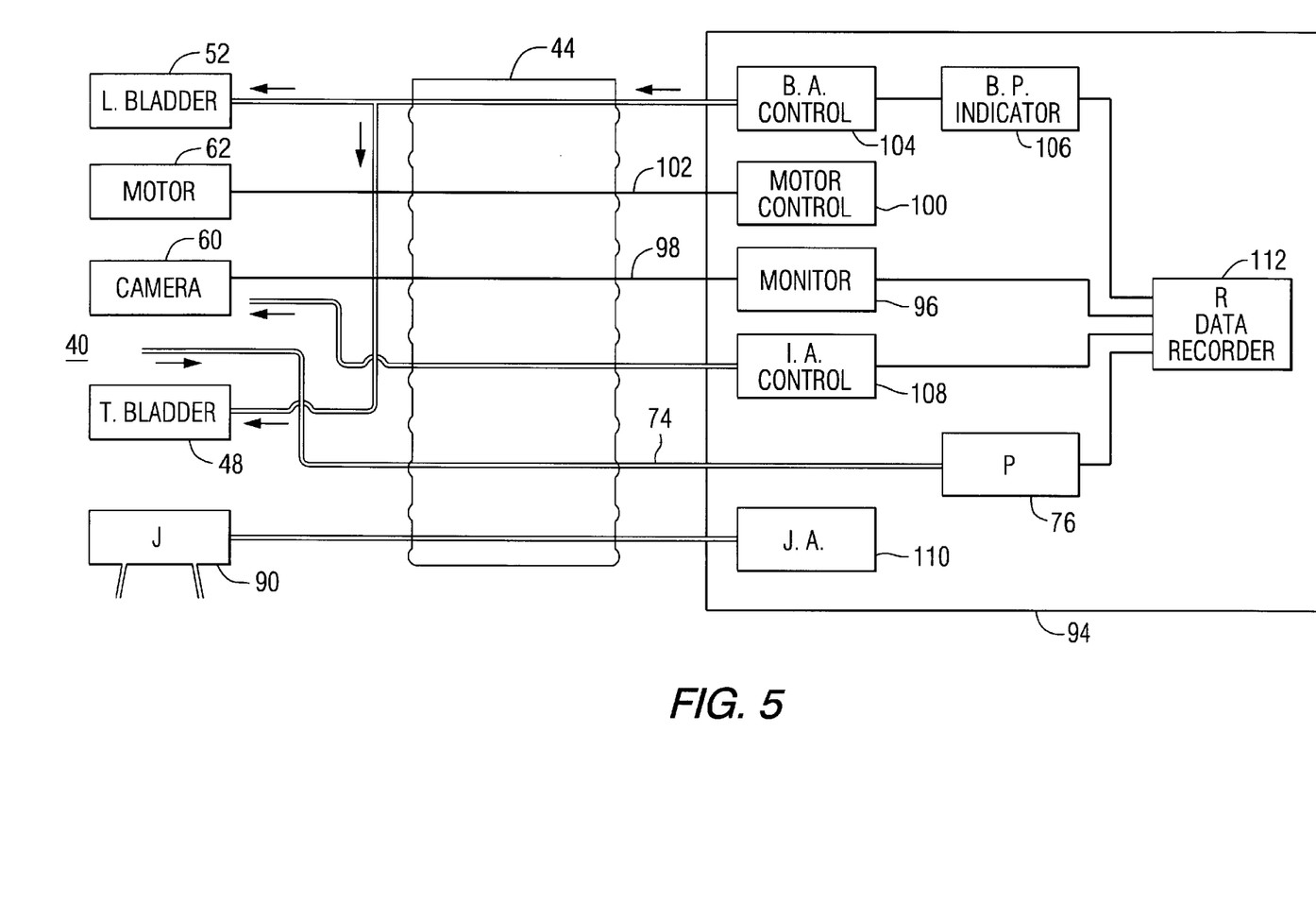
FIG. 5 is a functional block diagram of the systems utilized in the operation of the inspection tool of FIG. 2.

FIG. 5 is a functional block diagram of the various components of the system described above. Those portions of inspection tool 40 inserted into the turbine 10 are illustrated on the left side of FIG. 5 and are numbered consistently with the numbering of FIG. 2 and FIG. 4. A control console 94 is illustrated as including the various electrical and pneumatic systems necessary for the operation of the in-turbine components. A monitor 96 is connected to camera 60 by wiring 98 passing through the interior of guide tube 44. Similarly, a motor controller 100 is connected to motor 62 by wiring 102. An apparatus 104 for controlling the flow of inflation air supplied to bladders 48, 52 may include a bladder pressure indicator 106. An apparatus 108 for delivering inspection air 70 may be, for example, the OMEGA FMA-7000 Series mass flow controller as provided by OMEGA Engineering, Inc. A source of jet assist air 110 may be, for example, an attachment to the instrument air supply system available at the location of the turbine. Some or all of these components may be connected to a data recorder 112. The operator interface for control panel 94 may be any style known in the art, such as manual switches, analog or digital indicators, computer input and readout devices, etc.

Figure 6:
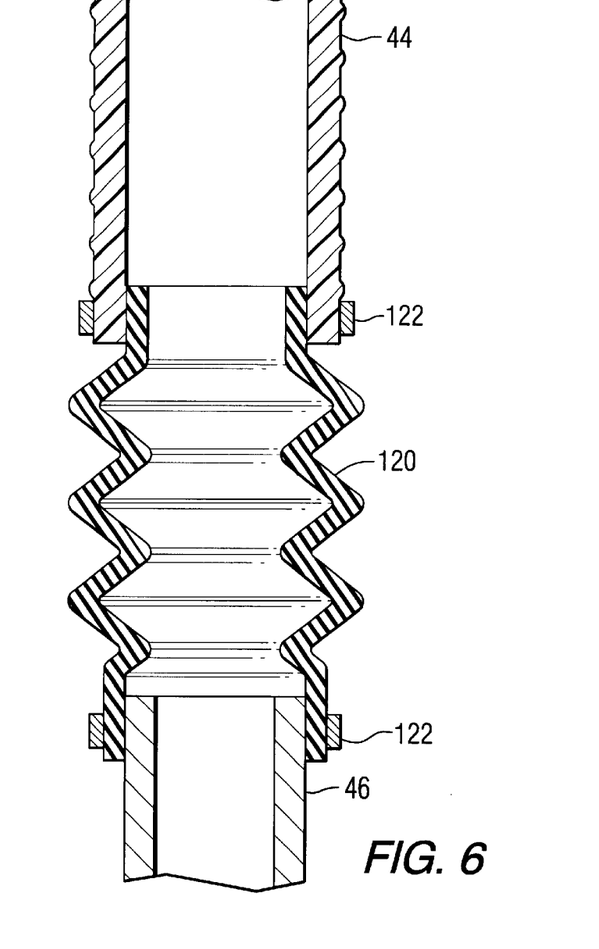
FIG. 6 is a cross-sectional view of a flexible member connected between the guide tube and trailing spool piece of the inspection tool of FIG. 2.

FIG. 6 is another device that facilitates the insertion of the inspection tool 40 into a turbine. A flexible, air tight bellows member 120 may be inserted between the guide tube 44 and the trailing spool 46 and held in place by band clamps 122. The flexible bellows member 120 provides a means for flexing between the rigid inspection tool 40 members and the guide tube 44, thereby allowing the tool 40 to more easily be inserted through bends in the steam line leading to the inlet 22 of the steam turbine 10. Bellows member may be formed of a rubber material having sufficient rigidity for positioning the guide tube 44 relative to the trailing spool 46, but with adequate flexibility provided by the bellows to allow bending as the tool 40 passes through a bend in the steam line.

Figure 7:
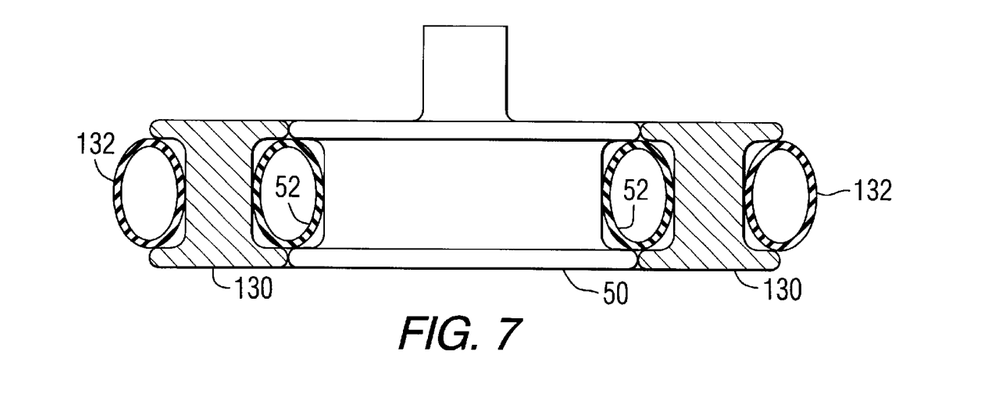
FIG. 7 is a cross-sectional view of a second, larger spool piece installed around the leading spool piece of the inspection tool of FIG. 2.

Inspection tool 40 may be used in turbines of various designs and sizes. As a result, the outside diameter of leading and trailing spool pieces 46,50 may be selected for the particular turbine being inspected. In one embodiment, the spool pieces 46,50 may be changed each time a different size is needed. In an alternative embodiment, a larger spool piece may be disposed around a smaller spool piece whenever needed, as illustrated in FIG. 7. FIG. 7 illustrates the leading spool piece 50 and its associated bladder 52 as described above. A second larger spool piece 130 is installed over the leading spool piece 50. Bladder 52 provides an air tight seal between the two spool pieces 50,130. A second larger bladder 132 is associated with the larger spool piece 130 for sealing to a larger diameter outer cylinder inlet sleeve 24 as shown in FIG. 2. The second bladder 132 may have its own independent air supply or it may be interconnected with the air supply for bladder 52. It may be appreciated that a similar larger spool piece would be installed over the trailing spool piece 46. By installing and removing the larger spool piece 130 as dictated by the size of the inlet sleeve 24, the inspection tool 40 may be adapted for use with a variety of turbine designs without the need for complete disassembly of the tool.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method for inspecting the inlet sleeve bell seal of a turbine, the method comprising the steps of:
   providing a tool having a pair of bladders spaced along a guide tube;
   inserting the tool into a turbine inlet to an inspection position wherein a turbine bell seal is disposed between the pair of bladders;
   inflating the pair of bladders to form a sealed volume having a leakage path through the bell seal;
   establishing and varying a flow of pressurized air into the sealed volume;
   recording data representing the pressure in the sealed volume as a function of the rate of flow of pressurized air; and
   comparing the recorded data to predetermined standard data to determine a condition of the bell seal.

2. The method of claim 1, further comprising the steps of:
   inserting the inspection tool to a test position removed from the bell seal;
   inflating the pair of bladders to form a sealed volume having no known leakage path;
   introducing pressurized air into the sealed volume having no known leakage path; and
   monitoring the pressure in the sealed volume having no known leakage path to confirm the proper operation of the pair of bladders.

3. The method of claim 2, further comprising the steps of:
   performing the steps of claim 2 a first time prior to the step of inserting the tool to an inspection position; and
   performing the steps of claim 2 a second time after the step of recording data representing the pressure in the sealed volume.

4. The method of claim 1, further comprising the steps of:
   providing a camera on the tool; and
   monitoring the output of the camera during the step of inserting the tool into a turbine inlet to determine when the tool is in the inspection position.

5. The method of claim 4, further comprising the step of monitoring the output of the camera to perform a visual inspection of the bell seal.

6. The method of claim 1, further comprising the steps of:
   attaching a jet assist nozzle to the inspection tool; and
   exhausting pressurized air through the jet assist nozzle during the step of inserting the tool into a turbine inlet.

7. The method of claim 1, further comprising the steps of:
   connecting a tube to the tool;
   inserting a flexible rod into the tube to prevent buckling of the tube; and
   wherein the step of inserting the tool into a turbine inlet comprises exerting a pushing force on the tube.

8. The method of claim 1, further comprising the steps of:
   rotatably attaching a camera to the guide tube;
   providing a motor for rotating the camera about the longitudinal axis of the guide tube;
   positioning the tool so that the camera is proximate the bell seal; and
   monitoring the output of the camera as it is rotated by the motor to perform a visual inspection of the bell seal.

9. The method of claim 8, further comprising the step of monitoring the output of the camera to determine when the tool is in the inspection position.

10. An apparatus for in-situ inspection of a bell seal of a turbine, the apparatus comprising:
    a guide tube adapted for insertion into an inlet of a turbine;
    a pair of inflatable bladders attached to the guide tube and separated by a space sufficient to span a bell seal of the turbine;
    an inspection air flow path having an outlet disposed between the pair of bladders;
    a mass flow controller for providing inspection air through the inspection air flow path over a range of pressures; and
    a flow sensor for indicating the rate of flow of air through the inspection air flow path over the range of pressures.

11. The apparatus of claim 10, further comprising a camera connected to the guide tube and disposed between the pair of inflatable bladders.

12. The apparatus of claim 11, further comprising a motor connected between the camera and the guide tube for rotating the camera about a longitudinal axis of the guide tube.

13. The apparatus of claim 10, further comprising:
    a jet assist nozzle connected to the guide tube; and
    an air supply connected to the jet assist nozzle.

14. The apparatus of claim 10, further comprising a flexible rod disposed within the guide tube.

15. The apparatus of claim 10, further comprising;
    a trailing spool piece connected to the guide tube;
    a leading spool piece connected to the trailing spool piece by a shaft;
    wherein each of the pair of bladders is disposed about the circumference of a respective one of the trailing spool piece and the leading spool piece.

16. The apparatus of claim 15, further comprising:
    a passage formed in the trailing spool piece and having a first end opening into the space between the pair of bladders; and
    a tube connected between a second end of the passage and the pressure sensor for communicating the pressure in the space between the bladders to the pressure sensor.

17. The apparatus of claim 15, further comprising:
    a frame rotatably supported about the shaft;
    a motor attached to the frame, the motor adapted to rotate the frame about the shaft; and
    a camera attached to the frame.

18. The apparatus of 15, further comprising a camera disposed between the pair of bladders and attached to one of the leading spool, the trailing spool, and the shaft.

19. The apparatus of claim 18, further comprising a motor attached between the camera and the one of the leading spool, the trailing spool, and the shaft and operable to rotate the camera about a longitudinal axis of the shaft.

20. The apparatus of claim 15, further comprising a bellows member connected between the trailing spool piece and the guide tube.

21. The apparatus of claim 15, further comprising:

a second spool piece disposed around each of the trailing and the leading spool piece in sealing contact with the respective one of the pair of inflatable bladders; and a second inflatable bladder disposed around the circumference of each of the second spool pieces.

22. An inspection apparatus comprising:

a guide tube having an insertion end;

a trailing bladder connected to the insertion end of the guide tube;

a leading bladder spaced apart from and connected to the trailing bladder;

a means for selectively inflating the trailing bladder and the leading bladder;

a means for providing a variable flow of air to the space between the leading bladder and the trailing bladder;

a means for measuring the rate of flow provided by the means for providing a variable flow of air; and a means for measuring the static air pressure in the space between the leading bladder and the trailing bladder as a function of the rate of flow.

23. The apparatus of claim 22, further comprising:

a camera disposed between the leading bladder and the trailing bladder; and a monitor connected to the camera.

24. The apparatus of claim 23, further comprising a means for rotating the camera about a longitudinal axis of the guide tube.

25. The apparatus of claim 22, further comprising a means for exerting a force on the guide tube sufficient to insert the insertion end into a turbine.

26. The apparatus of claim 22, further comprising a flexible member connected between the insertion end of the guide tube and the leading bladder.

* * * * *